United States Patent
Kim et al.

(10) Patent No.: US 7,876,954 B2
(45) Date of Patent: Jan. 25, 2011

(54) METHOD AND DEVICE FOR GENERATING A DISPARITY MAP FROM STEREO IMAGES AND STEREO MATCHING METHOD AND DEVICE THEREFOR

(75) Inventors: Eun-Chul Kim, Suwon-si (KR); Khi-Soo Jeong, Hwaseong-si (KR); Young-Sin Moon, Suwon-si (KR); Hyun-Jeong Shim, Seoul (KR); Hyo-Jin Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 901 days.

(21) Appl. No.: 11/759,601

(22) Filed: Jun. 7, 2007

(65) Prior Publication Data

US 2007/0286476 A1 Dec. 13, 2007

(51) Int. Cl.
*G06K 9/00* (2006.01)
(52) U.S. Cl. ........................ 382/154; 382/199
(58) Field of Classification Search .................. 382/154
See application file for complete search history.

(56) References Cited

U.S. PATENT DOCUMENTS

| | | | | |
|---|---|---|---|---|
| 5,487,116 A | * | 1/1996 | Nakano et al. | 382/104 |
| 5,566,246 A | * | 10/1996 | Rao | 382/154 |
| 5,684,890 A | * | 11/1997 | Miyashita et al. | 382/154 |
| 5,719,954 A | * | 2/1998 | Onda | 382/154 |
| 5,867,592 A | * | 2/1999 | Sasada et al. | 382/154 |
| 6,064,775 A | * | 5/2000 | Suzuki et al. | 382/254 |
| 6,556,704 B1 | * | 4/2003 | Chen | 382/154 |
| 6,763,125 B2 | * | 7/2004 | Ohta | 382/104 |
| 7,715,591 B2 | * | 5/2010 | Owechko et al. | 382/104 |
| 2001/0036307 A1 | * | 11/2001 | Hanna et al. | 382/154 |
| 2002/0039438 A1 | * | 4/2002 | Mori et al. | 382/154 |
| 2002/0164068 A1 | * | 11/2002 | Yan | 382/154 |
| 2003/0081815 A1 | * | 5/2003 | Shima et al. | 382/106 |
| 2004/0022439 A1 | * | 2/2004 | Beardsley | 382/224 |
| 2005/0063582 A1 | * | 3/2005 | Park et al. | 382/154 |
| 2005/0201591 A1 | * | 9/2005 | Kiselewich | 382/104 |
| 2006/0291719 A1 | * | 12/2006 | Ikeda et al. | 382/154 |
| 2007/0183628 A1 | * | 8/2007 | Carlson et al. | 382/103 |
| 2007/0286476 A1 | * | 12/2007 | Kim et al. | 382/154 |

FOREIGN PATENT DOCUMENTS

| | | |
|---|---|---|
| JP | 07336669 | 12/1995 |
| JP | 2001-184497 | 7/2001 |
| KR | 1020020095752 | 12/2002 |
| WO | WO2004012147 | 2/2004 |

\* cited by examiner

*Primary Examiner*—Sath V Perungavoor
(74) *Attorney, Agent, or Firm*—The Farrell Law Firm, LLP

(57) ABSTRACT

For stereo matching, edge images are extracted from stereo images. An edge mask matching an edge form of a window relating to a reference edge pixel is searched for from among predefined edge masks mapped to predefined edge forms capable of appearing within a predetermined size window having a center of the reference edge pixel among edge pixels of a reference edge image of the edge images. Among edge pixels of a search edge image of the edge images, an edge pixel located at a center of a window having an edge form matching the searched edge mask is searched for and is set to a corresponding edge pixel mapped to a corresponding point with respect to the reference edge pixel. Among the edge pixels of the reference edge image, the reference edge pixel is used to currently search for the corresponding edge pixel from the search edge image.

12 Claims, 5 Drawing Sheets

(a)    (b)    (c)    (d)

| 1 | 1 | 0 |
|---|---|---|
| 0 | 1 | 0 |
| 0 | 1 | 0 |

| 1 | 1 | 1 |
|---|---|---|
| 0 | 1 | 0 |
| 0 | 1 | 0 |

| 0 | 1 | 1 |
|---|---|---|
| 0 | 1 | 0 |
| 0 | 1 | 1 |

| 0 | 1 | 1 |
|---|---|---|
| 0 | 1 | 0 |
| 1 | 1 | 0 |

FIG.5A

| 0 | 1 | 0 |
|---|---|---|
| 0 | 1 | 0 |
| 0 | 1 | 0 |

FIG.5B

METHOD AND DEVICE FOR GENERATING A DISPARITY MAP FROM STEREO IMAGES AND STEREO MATCHING METHOD AND DEVICE THEREFOR

PRIORITY

This application claims priority under 35 U.S.C. §119 to an application entitled "Method And Device For Generating a Disparity Map From Stereo Images And Stereo Matching Method And Device Therefor" filed in the Korean Intellectual Property Office on Jun. 7, 2006 and assigned Serial No. 2006-51175, the contents of which are incorporated herein by reference.

BACKGROUND OF THE INVENTION

1. Field of the Invention

The present invention relates generally to a technology for obtaining a three-dimensional image from stereo images, and in particular, to a method and device for generating a disparity map from stereo images and a stereo matching method and device therefor.

2. Description of the Related Art

Stereo matching technology is used to obtain a three-dimensional (3D) image from stereo images. Further, the stereo matching technology is used to obtain a 3D image from multiple two-dimensional (2D) images of an object photographed from different positions on the same line. The stereo images are a pair of 2D images of the object photographed from different positions.

In order to generate a 3D image from the 2D images in the conventional art, a z coordinate corresponding to depth information as well as x and y coordinates corresponding to vertical and horizontal position information are required. Disparity information of the stereo images is required to compute the z coordinate. The stereo matching technology is used to obtain the disparity. For example, if the stereo images are left and right images photographed by two left and right cameras, one of the left and right images is set as a reference image while the other image is set as a search image. In this case, a distance between the reference image and the search image with respect to the same point on a space, i.e., a coordinate difference, is referred to as the disparity. The disparity is obtained using the stereo matching technology.

A disparity map expressed by 3D coordinates is generated from pixel depth information using the disparity between the reference image and the search image with respect to all pixels thereof.

An example of stereo matching technology used to compute the disparity between the reference image and the search image in the conventional art will be briefly described herein. First, a predetermined size reference pixel window having the center of a reference pixel of the reference image is set. With respect to the search image, a search pixel window having the same size as the reference pixel window is set centering on search pixels. Among pixels of the reference image, the reference pixel is used to currently search for a correspondence point from the search image. Among pixels of the search image, the search pixel is used to currently determine whether it is mapped to the correspondence point with respect to the reference pixel. The window has a matrix formed by a center pixel and peripheral pixels surrounding it.

Similarity between pixels within a reference pixel window and each search pixel window is computed. A search pixel of a search pixel window having a largest similarity value with respect to the reference pixel window among search pixel windows is defined as a correspondence pixel mapped to the correspondence point. The disparity is computed as a distance between the reference pixel and the correspondence pixel.

In order to compute the similarity between pixels within the reference pixel window and each search pixel window, a method that computes and compares an average value of the pixels within the reference pixel window and an average value of the pixels within each search pixel window is utilized.

A process for computing and comparing an average value of the pixels within the reference pixel window and an average value of the pixels within each search pixel window requires an increased processing time and an increased amount of memory in use is utilized in order to obtain the disparity between the reference image and the search image. Simply, because the average values of all pixel values within the windows are computed and compared, all the pixel values and the average values thereof within the windows should be stored, such that there is an increase in an amount of memory in use and a processing time. Further, because all correspondence pixels should be searched for with respect to all pixels of an image, there is a significant increase in the amount of memory in use and the processing time.

Alternatively, an embedded system adopted in various mobile terminals of small products such as mobile communication terminals has many limitations, i.e., small power supply capacity, low computation rate of a processor, and small memory capacity. In practice, a function requiring a large amount of memory in use and a long processing time is difficult to be adopted in the embedded system.

In the embedded system different from a computer, it difficult to adopt the various functions for obtaining a 3D image from stereo images to exploit the 3D image.

SUMMARY OF THE INVENTION

Therefore, the present invention provides a method and device for generating a disparity map and a stereo matching method and device therefor that can reduce an amount of memory in use and a processing time required to obtain a 3-D image from stereo images.

Moreover, the present invention provides a stereo matching method and device that can simply implement a stereo matching process for stereo images. The present invention provides a disparity map generation method and device that can simply generate a disparity map from stereo images.

In accordance with an aspect of the present invention, there is provided a stereo matching technology for extracting edge images from stereo images; searching for an edge mask matching an edge form of a window relating to a reference edge pixel from among predefined edge masks mapped to predefined edge forms capable of appearing within a predetermined size window having a center of the reference edge pixel among edge pixels of a reference edge image of the edge images; and searching for an edge pixel located at a center of a window having an edge form matching the searched edge mask from among edge pixels of a search edge image of the edge images and setting the searched edge pixel to a corresponding edge pixel mapped to a corresponding point with respect to the reference edge pixel.

In accordance with another aspect of the present invention, there is provided a disparity map generation technology for generating an edge image disparity map based on distances between edge pixels of a reference edge image and corresponding edge pixels of a search edge image mapped thereto and generating a final disparity map by compensating a disparity map for a non-edge image region using interpolation between edge pixels of the edge image disparity map.

Among the edge pixels of the reference edge image, the reference edge pixel is used to currently search for the corresponding edge pixel from the search edge image.

BRIEF DESCRIPTION OF THE DRAWINGS

The above and other features and advantages of the present invention will be more clearly understood from the following detailed description taken in conjunction with the accompanying drawings, in which:

FIGS. 5A and 5B illustrate an example of matching in an edge form in accordance with the present invention.

DETAILED DESCRIPTION OF THE PREFERRED EMBODIMENTS

Preferred embodiments of the present invention will be described in detail herein below with reference to the accompanying drawings. In the following description, detailed descriptions of functions and configurations incorporated herein that are well known to those skilled in the art are omitted for clarity and conciseness. Further, an example in which stereo images are left and right images photographed by left and right cameras will be described.

Figure 1:
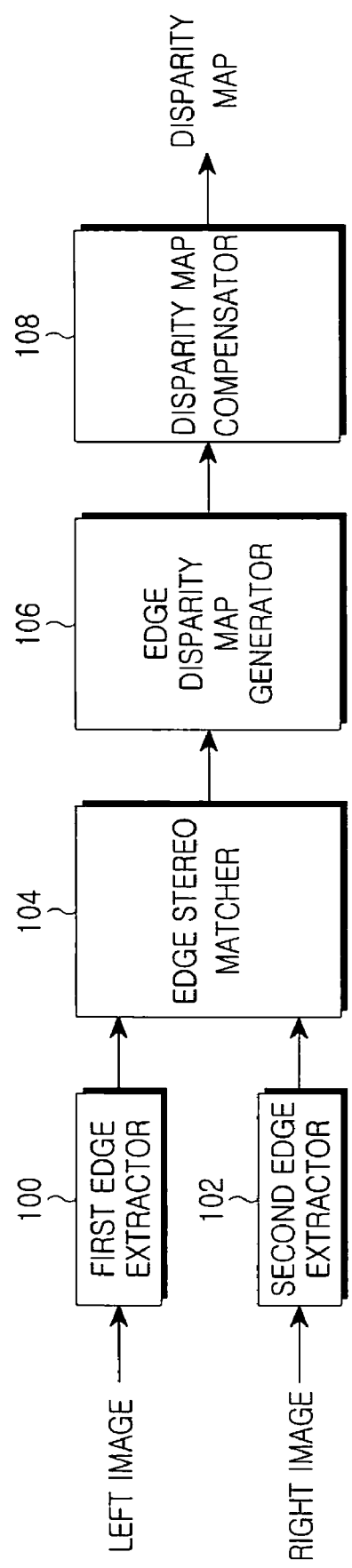
FIG. 1 is a block diagram illustrating a device for generating a disparity map in accordance with the present invention.

FIG. 1 is a block diagram illustrating a device for generating a disparity map in accordance with the present invention. The device is provided with first and second edge extractors 100 and 102, an edge stereo matcher 104, an edge disparity map generator 106, and a disparity map compensator 108.

Figure 2:
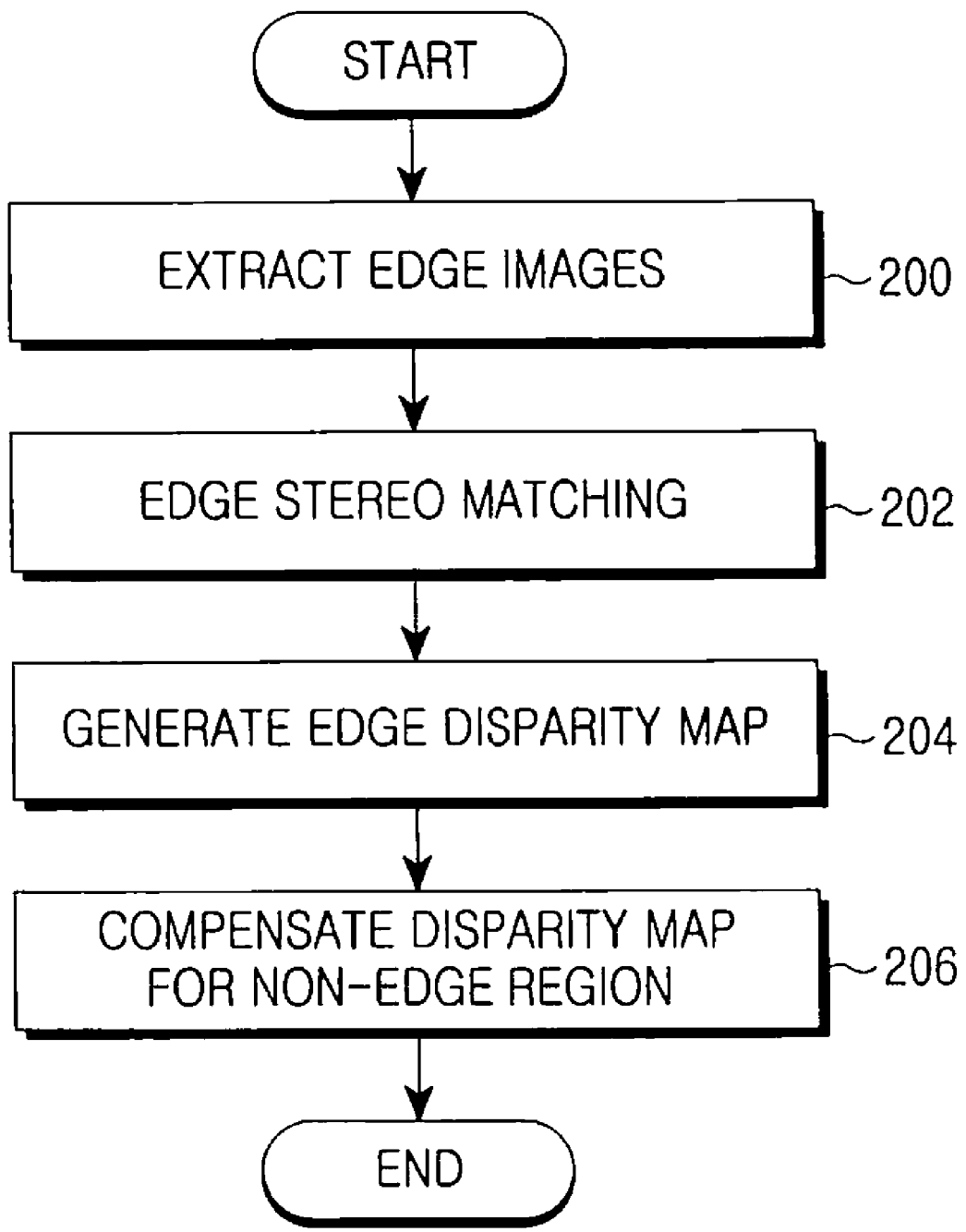
FIG. 2 is a flowchart illustrating a process for generating a disparity map in accordance with the present invention.

Referring to FIG. 2, the device for generating a disparity map will be described herein. The first and second edge extractor 100 and 102 receive stereo images. The stereo images are a pair of left and right images corresponding to two-dimensional (2D) images of an object photographed from different positions.

Figure 3:
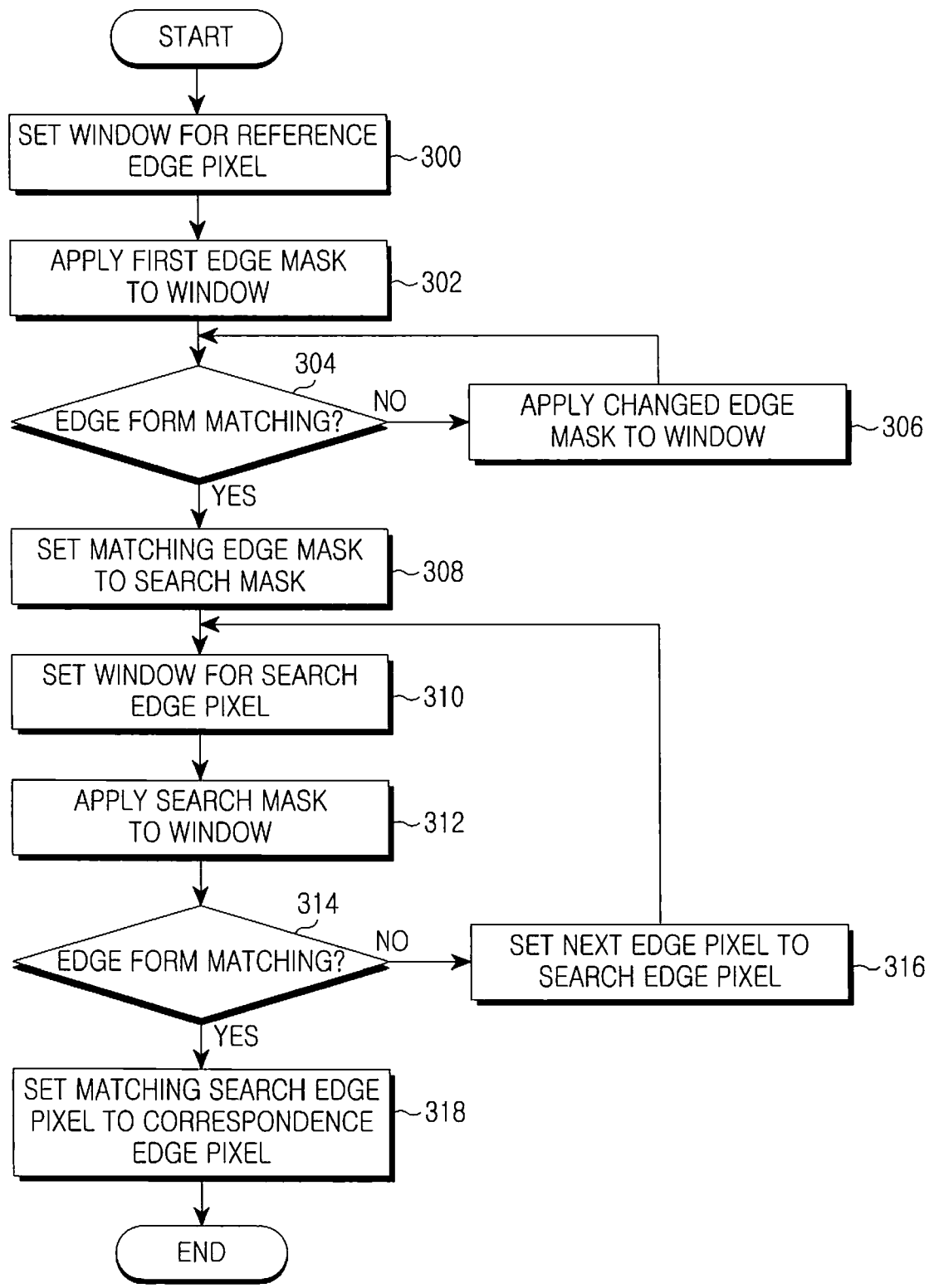
FIG. 3 is a flowchart illustrating a stereo matching process in accordance with the present invention.

Referring to FIG. 2, the first and second edge extractors 100 and 102 perform step 200 of. The first edge extractor 100 receives the left image of the left and right images corresponding to the stereo images and extracts an edge image. The second edge extractor 102 receives the right image of the left and right images corresponding to the stereo images and extracts an edge image. Herein, the edge images extracted by the first and second edge extractors 100 and 102 are referred to as left and right edge images, respectively. The left and right edge images are configured by edge pixels forming outlines of the left and right images. The extracted left and right edge images are input to the edge stereo matcher 104. Thereafter, the edge stereo matcher 104 performs step 202 of FIG. 2. The edge stereo matcher 104 performs an edge stereo matching process for the left and right edge images. FIG. 3 is a flowchart illustrating a stereo matching process in accordance with the present invention. Referring to FIG. 3, one of the left and right edge images is referred to as a reference edge image and the other edge image is referred to as a search edge image. Further, FIG. 3 illustrates a process for searching for a corresponding edge pixel from among edge pixels of the search edge image with respect to one reference edge pixel among edge pixels of the reference edge image. To search for corresponding edge pixels with respect to all edge pixels of the reference edge image, the edge stereo matcher 104 repeats the process of FIG. 3 a number of times corresponding to the number of edge pixels of the reference edge image. Further, when searching for corresponding edge pixels of the search edge image with respect to the edge pixels of the reference edge image, for example, a search is sequentially performed from a first scan line and is sequentially performed from a first edge pixel on one scan line as in the conventional case.

Among the edge pixels of the reference edge image, a reference edge pixel is used to currently search for a corresponding point from the search edge image. Among the edge pixels of the search edge image, a search edge pixel is used to currently determine whether it is mapped to the corresponding point with respect to the reference edge pixel.

First, in step 300 of FIG. 3, the edge stereo matcher 104 sets a predetermined size reference edge pixel window with respect to the reference edge pixel among the edge pixels of the reference edge image. Then, in step 302 the edge stereo matcher 104 applies a first edge mask of a predefined number of different edge masks to the reference edge pixel window and in step 304, determines whether an edge form of the reference edge pixel window matches that of the applied edge mask. If the edge form of the reference edge pixel window does not match that of the applied edge mask, the edge stereo matcher 104 changes the edge mask for the reference edge pixel window to a different edge mask and applies the different edge mask in step 306. Thereafter, the edge stereo matcher 104 returns to step 304 to determine whether the edge form of the reference edge pixel window matches that of the applied edge mask. Using the above process, an edge mask matching the edge form of the reference edge pixel window is found.

The window has a matrix formed by a center pixel corresponding to the reference edge pixel and peripheral pixels surrounding it. The edge mask is predefined which is mapped to a predefined edge form capable of appearing within the window. A window size is set to be equal to an edge mask size. A size of the number of horizontal pixels times the number of vertical pixels is predefined to one size, for example 3×3, 7×7, 9×9, and so on. As the window or edge mask size is enlarged, a corresponding edge pixel can be correctly searched for, but a processing amount and time increase because the number of pixels to be processed increases. Therefore, the window and edge mask sizes should be properly defined at a design time while considering the performance of the system to be adopted in the present invention.

Figure 4:
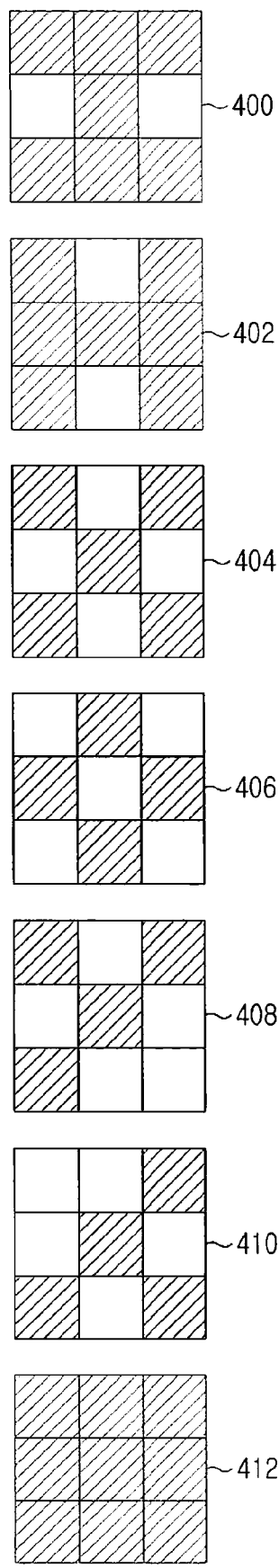
FIG. 4 illustrates examples of edge masks in accordance with the present invention.

FIG. 4 illustrates an example in which a vertical edge mask 400, a horizontal edge mask 402, an X-shaped edge mask 404, a diamond-shaped edge mask 406, an upward edge mask 408, a downward edge mask 410, and an entire edge mask 412 are defined as edge masks. Further, FIG. 4 illustrates an example in which the edge mask size is 3×3, i.e., the window size of 3×3 is designated by one center pixel and eight peripheral pixels surrounding it. Among nine points of each edge mask, for example, a shaded point has a logic value "1" and a blank point has a logic value "0".

Among the masks described above, the vertical edge mask 400 is used to search for a corresponding edge pixel when the edges within the window having the center of the reference edge pixel are vertically formed. The horizontal edge mask 402 is used to search for a corresponding edge pixel when the edges within the window having the center of the reference edge pixel are horizontally formed. The X-shaped edge mask 404 is used to search for a corresponding edge pixel when the edges within the window having the center of the reference edge pixel form the X shape. The diamond-shaped edge mask 406 is used to search for a corresponding edge pixel when the edges within the window having the center of the reference edge pixel form the diamond shape. The upward edge mask 408 is used to search for a corresponding edge pixel when the edges within the window having the center of the reference edge pixel are formed in the upward direction rather than the vertical direction. The downward edge mask 410 is used to search for a corresponding edge pixel when the edges within the window having the center of the reference edge pixel are formed in the downward direction rather than the vertical direction. The entire edge mask 412 is used to search for a corresponding edge pixel when all pixels within the window having the center of the reference edge pixel are edges.

Therefore, in steps 302 to 306, until an edge mask matching the reference edge pixel window is found from among a plurality of different predefined edge masks, as in the examples of FIG. 4, a matching check is sequentially performed from the first edge mask.

An example of the matching check will be described when an edge mask is applied to the reference edge pixel window. For example, when the edge form of the reference edge pixel window is vertical, various cases including an example of FIG. 5A can be present. When the vertical edge mask 400 of FIG. 4 is applied, a result as illustrated in FIG. 5B is obtained. In FIGS. 5A and 5B, "0" is the logic value "0" and "1" is the logic value "1". If the edge mask is applied, it means that "AND" operations are performed on the reference edge pixel and the edge mask on a pixel-by-pixel basis. When the reference edge pixel window has the vertical edge form as illustrated in (a)~(d) of FIG. 5A and the vertical edge mask 400 is applied, a result is substantially equal to a value of the vertical edge mask 400 as illustrated in FIG. 5B. This is the case where the reference edge pixel window matches the edge form of the vertical edge mask 400. Because the edge mask application and the matching check relating to the remaining edge forms can be easily understood by referring to the above-described example, further description is omitted.

In step 308, the matching edge mask is set to a search mask if an edge mask matching an edge form of the reference edge pixel window has been searched for in the process of step 302 to 306.

In step 310, a window for a search edge pixel among the edge pixels of the search edge image is set in the same manner that the window for the reference edge pixel is set in step 300.

In step 312, the search mask is applied to the search edge pixel window. In step 314, a determination is made as to whether the edge form of the search edge pixel window matches that of the search mask. If the edge form of the search edge pixel window does not match that of the search mask, the next edge pixel of the search edge image, i.e., the edge pixel next to the current search edge pixel on a scan line, is set to a search edge pixel in step 316 and then step 310 is performed again. Herein, a process applying the search mask to the search edge pixel window and determining whether the edge forms match is performed in the same manner that the edge mask is applied to the reference edge pixel window and a determination is made as to whether the edge forms match. Through the above process, a search edge pixel of an edge form matching the search mask is found.

In step 318, the matching search edge pixel is set to a corresponding edge pixel. That is, the corresponding edge pixel mapped to a corresponding point is found with respect to the current reference edge pixel.

The edge stereo matcher 104 searches for all corresponding edge pixels by repeating the above-described process of FIG. 3. Then, in step 204 of FIG. 2, the edge disparity map generator 106 generates an edge image disparity map using edge pixels of the reference edge image obtained by the edge stereo matcher 104 and corresponding edge pixels of the search edge image mapped thereto. The edge disparity map generator 106 generates an edge-related disparity map, which is different from the conventional disparity map generator. The process for generating an edge image disparity map is substantially equivalent to disparity map generation process of the conventional art. For example, the edge disparity map generator 106 generates an edge image disparity map on the basis of distances between the edge pixels of the reference edge image obtained by the edge stereo matcher 104 and the corresponding edge pixels of the search edge image mapped thereto.

Given that the edge image disparity map generated by the edge disparity map generator 106 is only the disparity map for the edge image rather than the entire image, a disparity map for a non-edge image region is excluded. In step 206 of FIG. 2, the disparity map compensator 108 generates a final disparity map by compensating the disparity map for the non-edge image region. The disparity map compensator 108 can compensate the disparity map for the non-edge image region of the edge image disparity map using the conventional inter-pixel interpolation method. That is, the disparity map for the non-edge image region is compensated by the interpolation of depth information, i.e., a z coordinate, between adjacent edge pixels in the edge image disparity map.

In accordance with the present invention, the stereo matching process searches for corresponding edge pixels of a search image with respect to only edge pixels rather than all pixels of a reference image.

A corresponding edge pixel is searched for by finding a search pixel window matching an edge form expressed by only "1" or "0" of one bit using a simple logical "OR" operation without computing and comparing an average value of pixels within a reference pixel window and an average value of pixels within each search pixel window. That is, the corresponding edge pixel is searched for by comparing edge forms with respect to an edge pixel of an edge image expressed by only one bit different from each pixel value of an original image.

Thus, an amount of memory in use and a processing time are significantly reduced.

Because a corresponding edge pixel is searched for only using edge images, the search error can be more reduced, in comparison with the case where a corresponding pixel is searched for with respect to all pixels of an original image.

In accordance with the present invention, a stereo matching process for stereo images can be easily implemented, such that a disparity map can be easily generated from the stereo images. Therefore, the present invention can reduce an amount of memory in use and a processing time necessary to obtain a 3D image from the stereo images, such that it can be easily applied to an embedded system.

While the exemplary embodiments of the present invention have been disclosed for illustrative purposes, those skilled in the art will appreciate that various modifications, additions, and substitutions are possible, without departing from the scope of the appended claims. In particular, the example of left and right images of the same object photographed by two left and right cameras has been described. Further, the present invention is also applicable to the case where multiple 2D images are photographed by at least three cameras. In this case, one image is set to the reference image and the remaining images are set to search images. An edge stereo matching process is performed for multiple search images with respect to one reference image. Where needed, a form and type of an edge mask as well as a window size and an edge mask size can be differently applied. Therefore, the present invention is not limited to the above-described embodiments, but is defined by the appended claims, along with their full scope of equivalents.

What is claimed is:

1. A stereo matching method for generating a disparity map from stereo images, comprising the steps of:
   extracting edge images from the stereo images;
   searching for an edge mask matching an edge form of a window relating to a reference edge pixel from among predefined edge masks mapped to predefined edge forms capable of appearing within a predetermined size window having a center of the reference edge pixel among edge pixels of a reference edge image of the edge images; and
   searching for an edge pixel located at a center of a window having an edge form matching the searched edge mask from among edge pixels of a search edge image of the edge images and setting the searched edge pixel to a corresponding edge pixel mapped to a corresponding point with respect to the reference edge pixel,
   wherein, among the edge pixels of the reference edge image, the reference edge pixel is used to currently search for the corresponding edge pixel from the search edge image.

2. The stereo matching method of claim 1, wherein the edge masks comprise a vertical edge mask mapped to a vertical edge form, a horizontal edge mask mapped to a horizontal edge form, an X-shaped edge mask mapped to an X-shaped edge form, a diamond-shaped edge mask mapped to a diamond-shaped edge form, an upward edge mask mapped to an upward edge form, a downward edge mask mapped to a downward edge form, and an entire edge mask mapped to an entire edge form.

3. The stereo matching method of claim 1, wherein the edge masks and the window are of matrix forms that are the same size.

4. A method for generating a disparity map from stereo images, comprising the steps of:
   extracting edge images from the stereo images;
   searching for an edge mask matching an edge form of a window relating to a reference edge pixel from among predefined edge masks mapped to predefined edge forms capable of appearing within a predetermined size window having a center of the reference edge pixel among edge pixels of a reference edge image of the edge images;
   searching for an edge pixel located at a center of a window having an edge form matching the searched edge mask from among edge pixels of a search edge image of the edge images and setting the searched edge pixel to a corresponding edge pixel mapped to a corresponding point with respect to the reference edge pixel;
   generating an edge image disparity map on a basis of distances between the edge pixels of the reference edge image and corresponding edge pixels of the search edge image mapped thereto; and
   generating a final disparity map by compensating a disparity map for a non-edge image region using interpolation between edge pixels of the edge image disparity map,
   wherein, among the edge pixels of the reference edge image, the reference edge pixel is used to currently search for the corresponding edge pixel from the search edge image.

5. The method of claim 4, wherein the edge masks comprise a vertical edge mask mapped to a vertical edge form, a horizontal edge mask mapped to a horizontal edge form, an X-shaped edge mask mapped to an X-shaped edge form, a diamond-shaped edge mask mapped to a diamond-shaped edge form, an upward edge mask mapped to an upward edge form, a downward edge mask mapped to a downward edge form, and an entire edge mask mapped to an entire edge form.

6. The method of claim 4, wherein the edge masks and the window are of matrix forms that are the same size.

7. A stereo matching device for generating a disparity map from stereo images, comprising:
   edge extractors for extracting edge images from the stereo images;
   an edge stereo matcher for searching for an edge mask matching an edge form of a window relating to a reference edge pixel from among predefined edge masks mapped to predefined edge forms capable of appearing within a predetermined size window having a center of the reference edge pixel among edge pixels of a reference edge image of the edge images, searching for an edge pixel located at a center of a window having an edge form matching the searched edge mask from among edge pixels of a search edge image of the edge images, and setting the searched edge pixel to a corresponding edge pixel mapped to a corresponding point with respect to the reference edge pixel,
   wherein, among the edge pixels of the reference edge image, the reference edge pixel is used to currently search for the corresponding edge pixel from the search edge image.

8. The stereo matching device of claim 7, wherein the edge masks comprise a vertical edge mask mapped to a vertical edge form, a horizontal edge mask mapped to a horizontal edge form, an X-shaped edge mask mapped to an X-shaped edge form, a diamond-shaped edge mask mapped to a diamond-shaped edge form, an upward edge mask mapped to an upward edge form, a downward edge mask mapped to a downward edge form, and an entire edge mask mapped to an entire edge form.

9. The stereo matching device of claim 7, wherein the edge masks and the window are of matrix forms that are the same size.

10. A device for generating a disparity map from stereo images, comprising:
    edge extractors for extracting edge images from the stereo images;
    an edge stereo matcher for searching for an edge mask matching an edge form of a window relating to a reference edge pixel from among predefined edge masks mapped to predefined edge forms capable of appearing within a predetermined size window having a center of the reference edge pixel among edge pixels of a reference edge image of the edge images, searching for an edge pixel located at a center of a window having an edge form matching the searched edge mask from among edge pixels of a search edge image of the edge images, and setting the searched edge pixel to a corresponding edge pixel mapped to a corresponding point with respect to the reference edge pixel;
    an edge disparity map generator for generating an edge image disparity map on a basis of distances between the edge pixels of the reference edge image and corresponding edge pixels of the search edge image mapped thereto; and
    a disparity map compensator for generating a final disparity map by compensating a disparity map for a non-edge image region using interpolation between edge pixels of the edge image disparity map, wherein, among the edge pixels of the reference edge image, the reference edge pixel is used to currently search for the corresponding edge pixel from the search edge image.

11. The device of claim 10, wherein the edge masks comprise a vertical edge mask mapped to a vertical edge form, a horizontal edge mask mapped to a horizontal edge form, an X-shaped edge mask mapped to an X-shaped edge form, a diamond-shaped edge mask mapped to a diamond-shaped edge form, an upward edge mask mapped to an upward edge form, a downward edge mask mapped to a downward edge form, and an entire edge mask mapped to an entire edge form.

12. The device of claim 10, wherein the edge masks and the window are of matrix forms that are the same size.

* * * * *